(12) United States Patent
Liu et al.

(10) Patent No.: US 7,225,315 B2
(45) Date of Patent: May 29, 2007

(54) HIGH READ PERFORMANCE FILE SYSTEM AND PROGRAM

(75) Inventors: Fuming Liu, Yokohama (JP); Shotaro Ohno, Yamato (JP)

(73) Assignee: Hitachi, Ltd., Tokyo (JP)

( * ) Notice: Subject to any disclaimer, the term of this patent is extended or adjusted under 35 U.S.C. 154(b) by 152 days.

(21) Appl. No.: 10/917,401

(22) Filed: Aug. 13, 2004

(65) Prior Publication Data

US 2005/0102484 A1 May 12, 2005

(30) Foreign Application Priority Data

Nov. 11, 2003 (JP) ............................. 2003-381610

(51) Int. Cl.
*G06F 12/00* (2006.01)

(52) U.S. Cl. ...................... 711/170; 711/173; 711/202; 711/114; 707/205

(58) Field of Classification Search ...................... None
See application file for complete search history.

(56) References Cited

U.S. PATENT DOCUMENTS

| | | | |
|---|---|---|---|
| 5,724,500 A | 3/1998 | Shinmura et al. | |
| 5,745,915 A | 4/1998 | Cooper et al. | |
| 6,073,209 A | 6/2000 | Bergsten | |
| RE38,410 E | 1/2004 | Hersch et al. | |
| 6,715,054 B2 | 3/2004 | Yamamoto | |
| 6,728,832 B2 | 4/2004 | Yamamoto et al. | |
| 7,024,534 B2 * | 4/2006 | Sasaki et al. | ............... 711/170 |
| 2002/0010762 A1 * | 1/2002 | Kodama | ..................... 709/219 |

FOREIGN PATENT DOCUMENTS

JP 2003-157151 5/2003

* cited by examiner

*Primary Examiner*—Mano Padmanabhan
*Assistant Examiner*—Horace L. Flournoy
(74) *Attorney, Agent, or Firm*—Antonelli, Terry, Stout and Kraus, LLP.

(57) ABSTRACT

To provide a file system including: a storage system having a plurality of volumes; a volume allocation table adapted to set the plurality of volumes for each directory; a file allocation table that stores attributes and divided block information of the file; a block reading table in which numbers of blocks read out in one reading operation for each volume are respectively set; and a read control module that controls to read data from the volume; wherein a read control module, when a read command is received, determines a volume to be read from the volume allocation table, determines the number of blocks read for each volume by referring to the block reading table, determines the blocks read for each volume based on the volume, the number of blocks, and the block information, and reads from each volume in parallel.

21 Claims, 16 Drawing Sheets

| Record # | File System | Mounted Directory | Mounted Volumes | Primary Volume (Yes/No) |
|---|---|---|---|---|
| 1 | Fast Redundant File System 1 | /home | Volume #1 | Yes |
| | | | Volume #2 | No |
| | | | Volume #3 | No |
| | | | Volume #4 | No |
| 2 | Fast Redundant File System 2 | /usr | Volume #5 | Yes |
| | | | Volume #6 | No |
| | | | Volume #7 | No |
| 3 | Fast Redundant File System 3 | /opt | Volume #8 | Yes |
| | | | Volume #9 | No |
| 4 | Fast Redundant File System 4 | /tmp | Volume #10 | Yes |

*FIG. 3*

| Record # | Detail |
|---|---|
| File 1 | "File name", "Data", "Access state", "Access right", "Data Block number list" |
| File 2 | "File name", "Data", "Access state", "Access right", "Data Block number list" |
| File 3 | "File name", "Data", "Access state", "Access right", "Data Block number list" |
| File 4 | "File name", "Data", "Access state", "Access right", "Data Block number list" |

*FIG. 4*

| Volume# | The number of blocks read from each Volume |
|---|---|
| Volume#1 | 4 |
| Volume#2 | 3 |
| Volume#3 | 2 |
| Volume#4 | 1 |
| Volume#5 | 1 |

FIG. 5

| Volume# | Block Number List# | The list of block numbers read from each Volume |
|---|---|---|
| Volume 1 | Block Number List 1 | 1, 2, 3, 4, 11, 12, 13, 14, 21, 22, 23, 24, 31, 32, 33, 34 |
| Volume 2 | Block Number List 2 | 5, 6, 7, 15, 16, 17, 25, 26, 27, 35, 36, 37 |
| Volume 3 | Block Number List 3 | 8, 9, 18, 19, 28, 29, 38, 39 |
| Volume 4 | Block Number List 4 | 10, 20, 30, 40 |

*FIG. 10*

| Volume # | Read Speed (Mbytes/s) | Number of Block Read |
|---|---|---|
| Volume #1 | 200 | 4 |
| Volume #2 | 150 | 3 |
| Volume #3 | 100 | 2 |
| Volume #4 | 50 | 1 |
| ... | ... | ... |
| Volume #10 | 50 | 1 |

*FIG. 14*

HIGH READ PERFORMANCE FILE SYSTEM AND PROGRAM

CLAIM OF PRIORITY

The present application claims priority from Japanese application P2003-381610 filed on Nov. 11, 2003, the content of which is hereby incorporated by reference into this application.

BACKGROUND

The present invention relates to a file system which is excellent in providing redundancy and exhibits an excellent read performance.

For access to a disk drive mounted under an operating system (OS), a file system allows a data file to be divided to several blocks, written into a single volume, and read from the single volume on a block basis.

As a known technique for a file system ensuring redundancy of a data file, U.S. Pat. No. 5,724,500 discloses a method in which backup regions of volumes are each divided to a number corresponding to a given number of cylinders provided in each multiwritten volume, pieces of data from the backup regions each divided to the given number are inputted concurrently and parallelly, and the inputted pieces of data are outputted to a backup destination in the order of the cylinders through a buffer within a CPU, thereby reducing backup time for the multiwritten volumes remarkably.

Furthermore, there is known a technique in which, when a disk controller in a storage system receives a write request from a host computer, the disk controller issues the same write request to a mirror disk drive in the same pair (refer to JP 2003-157151 A).

SUMMARY

In the above-mentioned related art, even when there are plural mirror volumes and backup volumes, only a single volume is mounted on a host side (or OS side). Therefore, there is no consideration for the amount of time necessary when reading a large-capacity file.

An embodiment of the present invention provides a file system capable of ensuring redundancy when writing and capable of reading in parallel from multiple volumes, thereby reading large-capacity data files in a short time.

An embodiment of the present invention is provided with a storage system including plural volumes, and a volume allocation table in which plural volumes are set for each directory. When a write command is received, a file is divided on a block basis, the same block of all volumes are written the volumes are set in the volume allocation table, and attributes of the file written into the volumes and block information about the divided blocks are stored in a file allocation table.

On the other hand, when a read command is received, a volume is determined from the volume allocation table based on a file directory, the number of blocks is obtained for each volume from a block reading table in which the numbers of blocks read out in a single reading operation from each volume are set, the number of blocks to be read is determined for each volume by referring to the volumes, the numbers of blocks, and the block information in the file allocation table, reading is performed from each volume for each determined number of blocks in parallel, and the plural read blocks are rearranged based on the block information in the file allocation table, and a file is assembled.

Therefore, the embodiment of the present invention enables high-speed file reading and writing processings.

BRIEF DESCRIPTION OF THE DRAWINGS

FIG. 3 is an explanatory diagram showing an example of a volume allocation table having set therein relationships between directories and mounted volumes according to the first embodiment of the present invention.

FIG. 4 is an explanatory diagram showing an example of a file allocation table according to the first embodiment of the present invention.

FIG. 5 is an explanatory diagram showing an example of a block reading table having set therein numbers of blocks read from volumes in response to a single read command according to the first embodiment of the present invention.

FIG. 10 shows a volume reading table created by the read control unit and having set therein correspondences between each volume and blocks to be read according to the first embodiment of the present invention.

FIG. 14 shows a table for setting the block reading table embodying aspect of the present invention.

DETAILED DESCRIPTION OF THE PREFERRED EMBODIMENTS

Hereinafter, an embodiment of the present invention is explained based on the accompanying drawings.

Figure 1:
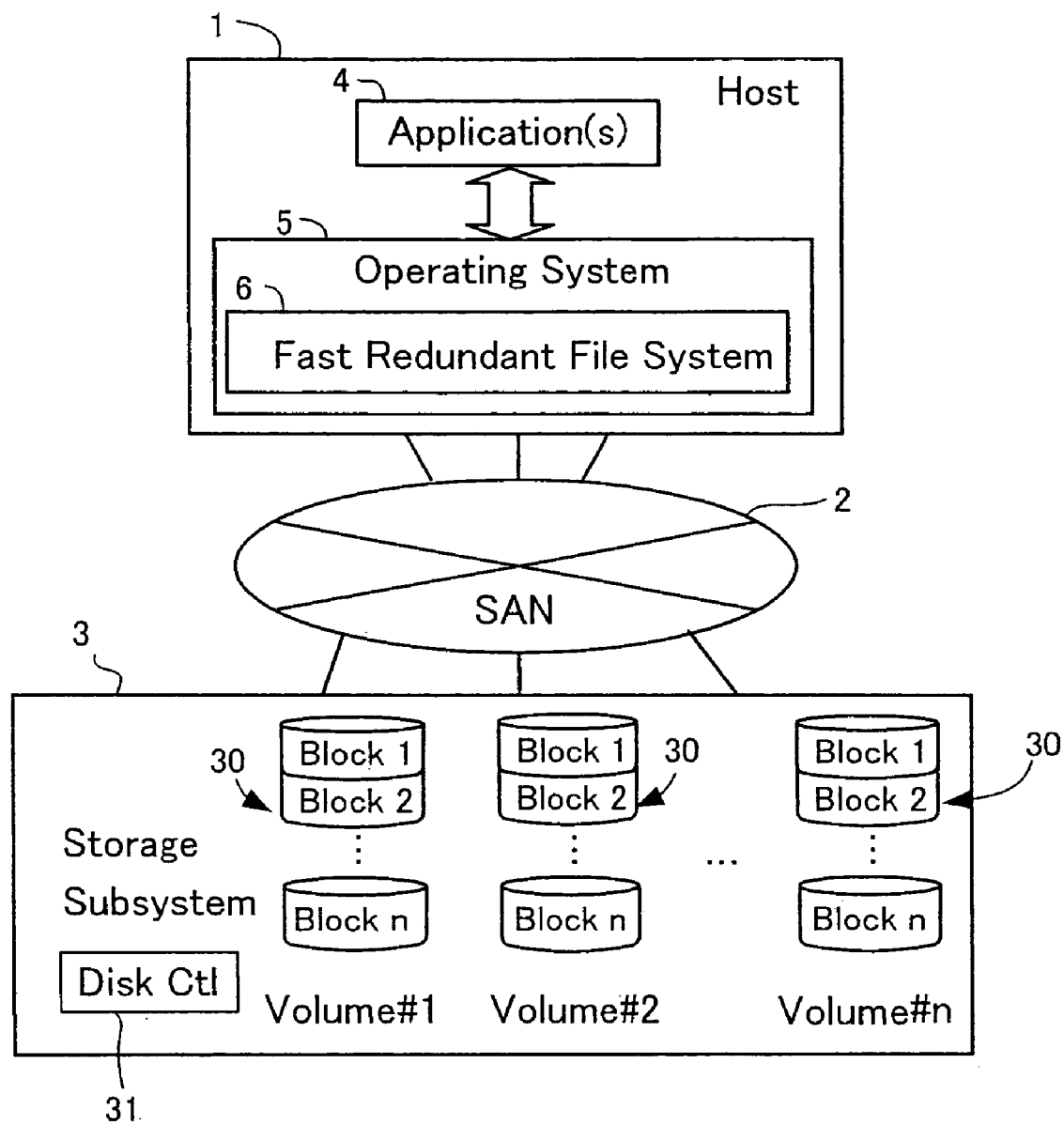
FIG. 1 is a block of a computer system according to a first embodiment of the present invention.

FIG. 1 shows an example in which a file system of the present invention is applied in a host computer 1 and a storage system 3 connected via a storage area network (SAN) 2.

The host computer 1 is provided with a CPU, a memory, a display device, a keyboard, a mouse, and the like, which are not shown in the diagram. An application 4 is executed on an operating system (OS) 5.

When the application 4 and the OS 5 access the storage system 3, the access is made to the storage system 3 via a file system 6. When a request to access the storage system 3 is received from the OS 5, the file system ("Fast Redundant File System" in the diagram) selects a volume and block to be accessed, as described below, and makes a request to the storage system 3.

The storage system 3 is provided with plural volumes #1 to #n. At each volume, a disk controller 31 controls on a disk drive constituting each volume, to read and to write to/from the volume and the block requested by the disk control unit 6 of the host computer 1 via the SAN 2. It should be noted that the storage system 3 saves the same data in plural volumes in order to give the data file redundancy.

Figure 2:
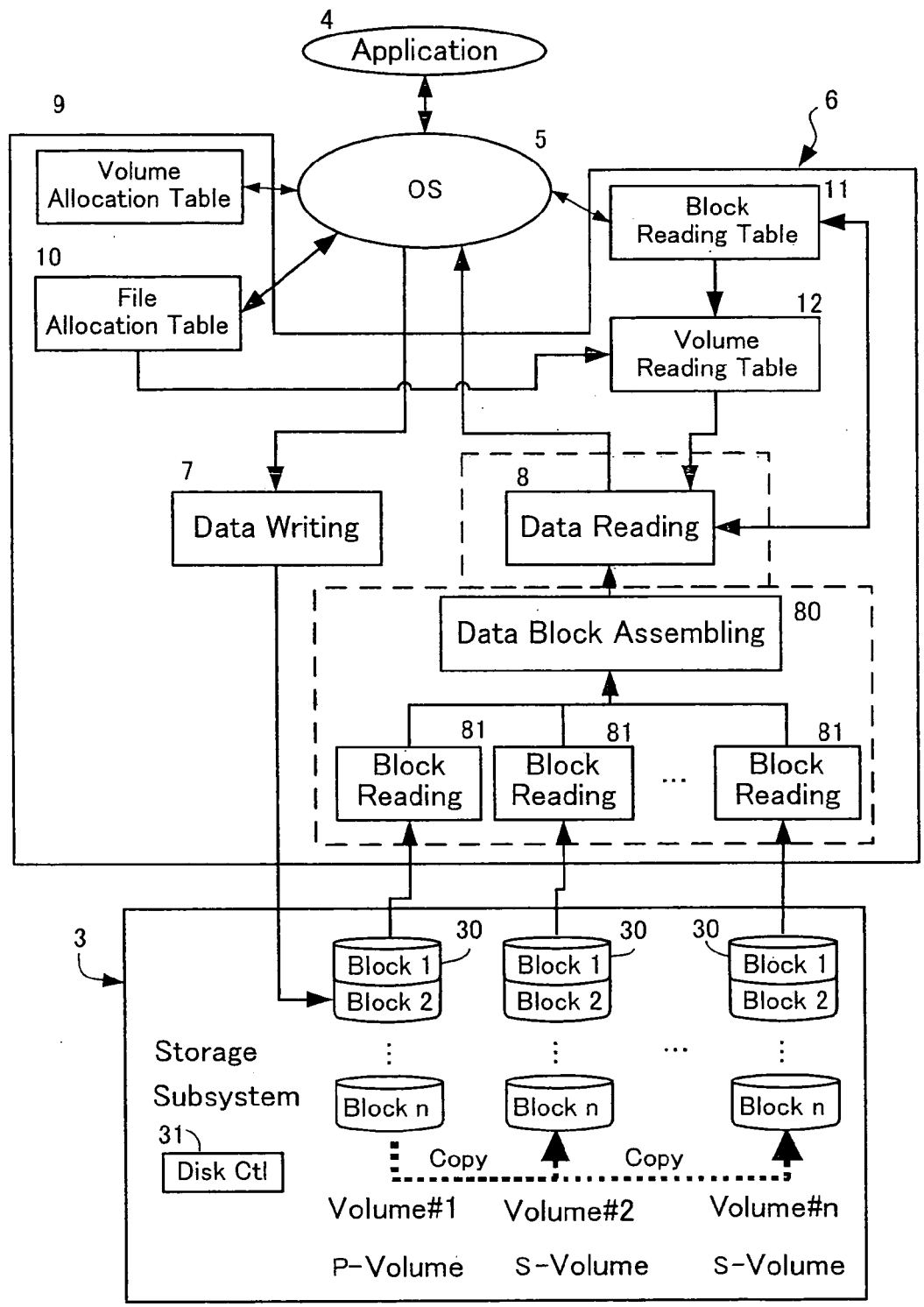
FIG. 2 is an explanatory diagram of a system construction centered around a file system according to the first embodiment of the present invention.

FIG. 2 shows an explanatory diagram of a system construction around the file system 6.

The file system 6 is mainly constituted of a write control unit 7 that writes files divided to blocks into any of the independent volumes #1 to #n, a read control unit 8 for reading on a block basis in parallel from the plural volumes 30 (#1 to #n), and various tables 9 to 12 having set therein correspondences between a file and the volumes 30 and blocks. It should be noted that, in FIG. 2, the OS 5 and the file system 6 are shown separated each other, but the file system 6 is a part of the OS 5.

First, the various tables 9 to 12 are explained.

FIG. 3 shows an example of the volume allocation table 9 managed by the OS 5, and shows correspondences between directories and volumes which the file system 6 mounts (i.e., usably integrates).

For example, next to record #1 is information about volumes in a directory "/home" which the file system 6 mounts. Four volumes #1, #2, #3, #4 are mounted in the directory "/home". When there are plural volumes under the mounted directory, a flag (YES or NO) is provided to distinguish which is the primary volume. The "YES" flag is set for the primary volume.

The primary volume corresponds to the independent volume 30 that the file system 6 accesses when writing the file, as described below. The mounted volumes other than the primary volume are secondary volumes, which replicate the content of the primary volume, as described below.

Furthermore, when the one volume 30 is mounted in the directory, it is not particularly necessary to set the primary volume flag. For example, only the one volume #10 is mounted under the mounted directory (Mounted directory) represented by "/tmp" in the diagram. In this case, the flag is maintained "NO". Since the file system 6 includes one volume, this is treated as the primary volume.

FIG. 4 shows an example of a file allocation table 10, having set therein file attributes and blocks of files to be stored, managed by the OS 5. In the file allocation table, attribute information is managed on a file basis.

In other words, the table is constituted with each file's name ("Filename" in the diagram), updated date ("Date" in the diagram), access state which is indicated by read or write ("Access state" in the diagram), access right ("Access right" in the diagram), list of block number of the volume used by the file, the directory which the file belongs to, etc., which are defined for each file ("Record #" in the diagram). It should be noted.

FIG. 5 shows an example of a block reading table 11 used when the file system 6 reads the files.

The block reading table 11 is set with the number of blocks read from each volume in response to a single read command. For example, at volume #1 four blocks are read by a single read command, and at the volume #2 three blocks are read by a single read command.

It should be noted that the differences in the number of blocks between volumes are predetermined according to the reading speed and other performance of the disk drive constituting the volume.

Furthermore, a volume reading table 12 is created by the read control unit 8 when reading the file. This is explained below.

Next, explanation is given regarding the write control unit 7 and the read control unit 8.

First, when a write command is received from the application 4, the write control unit 7 refers to the above-mentioned volume allocation table of FIG. 3, determines the primary volume from the directory of the data file to be written, issues the write command to the storage system 3 via the SAN 2 to write data to the primary volume and sends the data.

When the disk controller 31 of the storage system 3 receives the write command from the write control unit 7 of the file system 6. The disk controller 31 writes the data into the designated primary volume, and also writes the same data into the secondary volume that corresponds to the primary volume, the primary volume and the secondary volume constituting a pair of volumes.

The designation of the secondary volume is notified to the storage system 3 by the write control unit 7 upon each write command, or the file system 6 notifies the storage system 3 of it at predetermined timing (e.g., when initialization is performed, or when the volume allocation table is updated).

Figure 6:
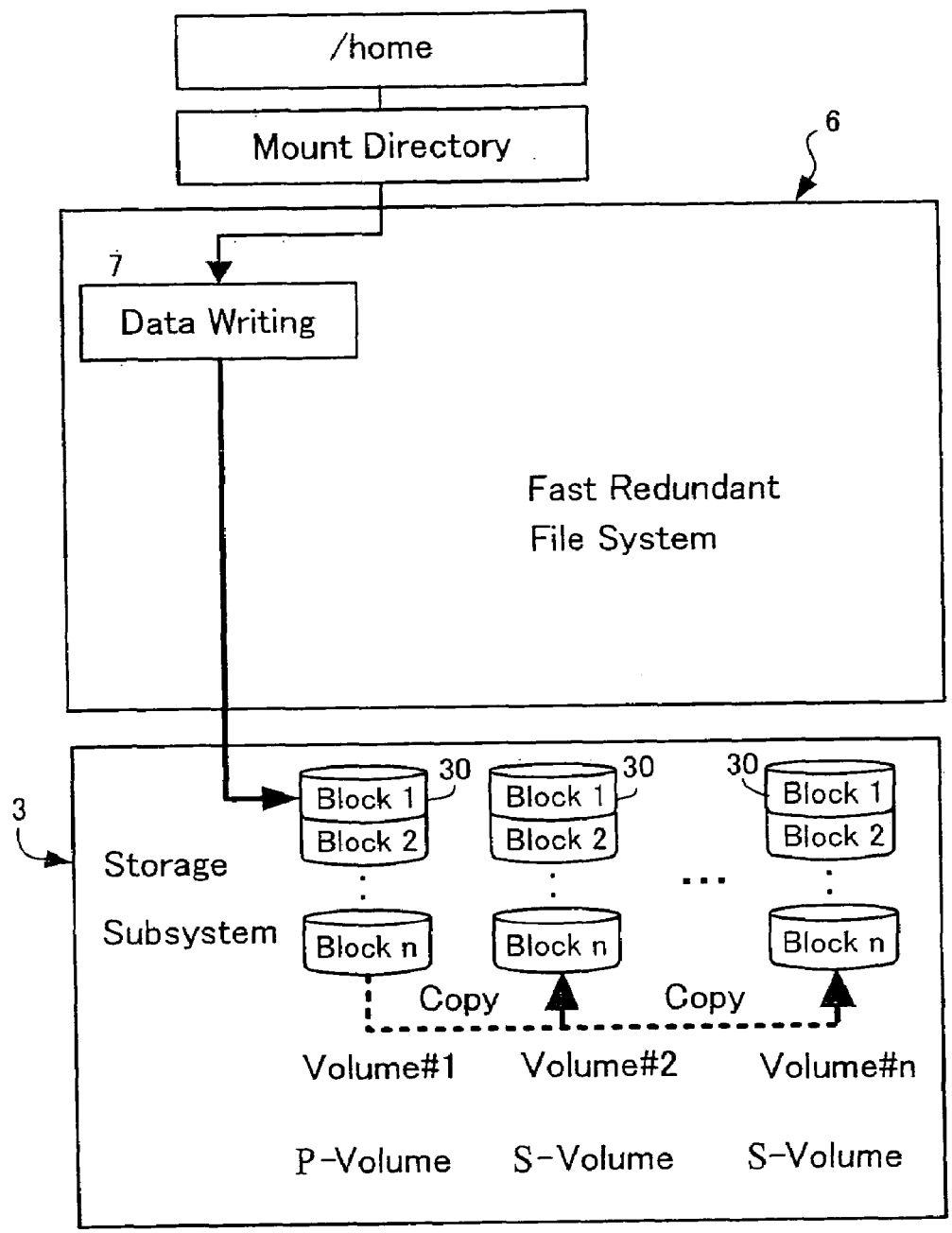
FIG. 6 is an explanatory diagram showing a flow of data when writing according to the first embodiment of the present invention.
Figure 7:
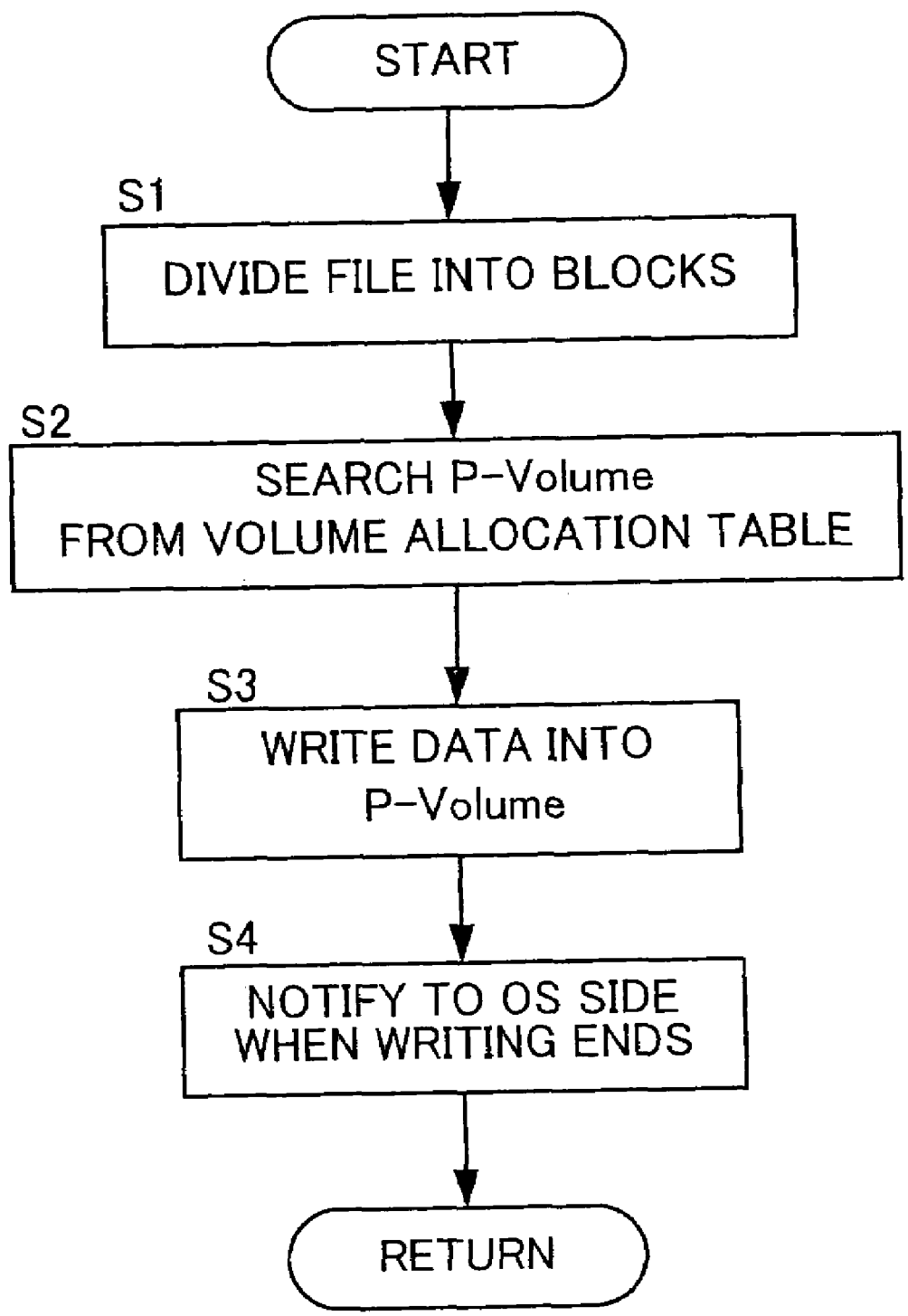
FIG. 7 is a flowchart showing an example of controls performed by a write control unit according to the first embodiment of the present invention.

FIG. 6 and FIG. 7 are referred while giving detailed explanation of the writing processing. FIG. 6 is an explanatory diagram showing a flow of data when writing. FIG. 7 is a flowchart showing an example of controls performed by the write control unit 7. The writing processing is executed at a time the write command is received.

FIG. 6 shows a case of writing a file in the directory "/home" which is mounted to the file system 6. When the write command for a file in the directory "/home" is received from the application 4, the write control unit 7 first divides the file to blocks with a predetermined data length (step S1 of FIG. 7).

Next, the write control unit 7 refers to the volume allocation table 9 shown in FIG. 3, and searches the volume #1, which is the primary volume, from the record where "/home" is mounted (step S2 of FIG. 7).

Then, the write control unit 7 issues the write command to the storage system 3 to write data to the volume #1, and also transfers the data block (step S3 of FIG. 7).

Accordingly, the disk controller 31 of the storage system 3 writes the data forwarded from the write control unit 7 into the volume #1 on a block basis, and writes the same data into the volumes #2, #3, and #4 which are the secondary volumes of the primary volume #1. For example, when a file in the directory "/home" is divided to 1 to 10 blocks, the same data is written into the blocks number 1 to 10 of each of volumes #1 to #4.

Then, when the writing ends, the disk controller 31 notifies the write control unit 7 that the writing has ended, and the write control unit 7 also notifies the application 4 that the writing has ended (step S4 of FIG. 7). It should be noted that, when the writing ends, the write control unit 7 writes the file's attributes and block division information into the file allocation table.

In this way, writing is performed in block units to the primary volume obtained from the volume allocation table, based on the mounted directory, and the mirroring or replication function of the storage system 3 writes the replicates into the secondary volumes which were predetermined.

Next, explanation is given regarding the read control unit 8.

In FIG. 2, the read control unit 8 is constituted by plural block reading units ("Block Reading" in the diagram) 81 which read data from each volume in block units, and a block assembling unit ("Data Block Assembling" in the diagram) 80 that re-assembles the data from the plural block reading units 81 in order according to the block numbers.

When the host computer 1 has plural ports connected to the SAN 2, the block reading units 81 may be provided to each port. Preferably, the block reading units 81 and the ports are provided in association with the number of volumes that read at a time. Alternatively, when there are a small number of physical ports connected to the SAN 2, the block reading units 81 may be provided in association with the volumes that read the logical ports at a time, and plural block reading units 81 may be provided to correspond to the logical ports.

As shown in the above-mentioned block reading table of FIG. 5, each volume may read different numbers of blocks for each read command owing to differences in performance of volumes. Therefore, the block reading units 81 of all the blocks do not necessarily finish reading simultaneously.

Therefore, the block assembling unit 80 rearranges the blocks that were read in parallel by the block reading units 81, and reassembles the original file, based on the volume numbers set in the above-mentioned volume allocation table 9 of FIG. 3 and the list of block number in the file allocation table 10 of FIG. 4.

Figure 8:
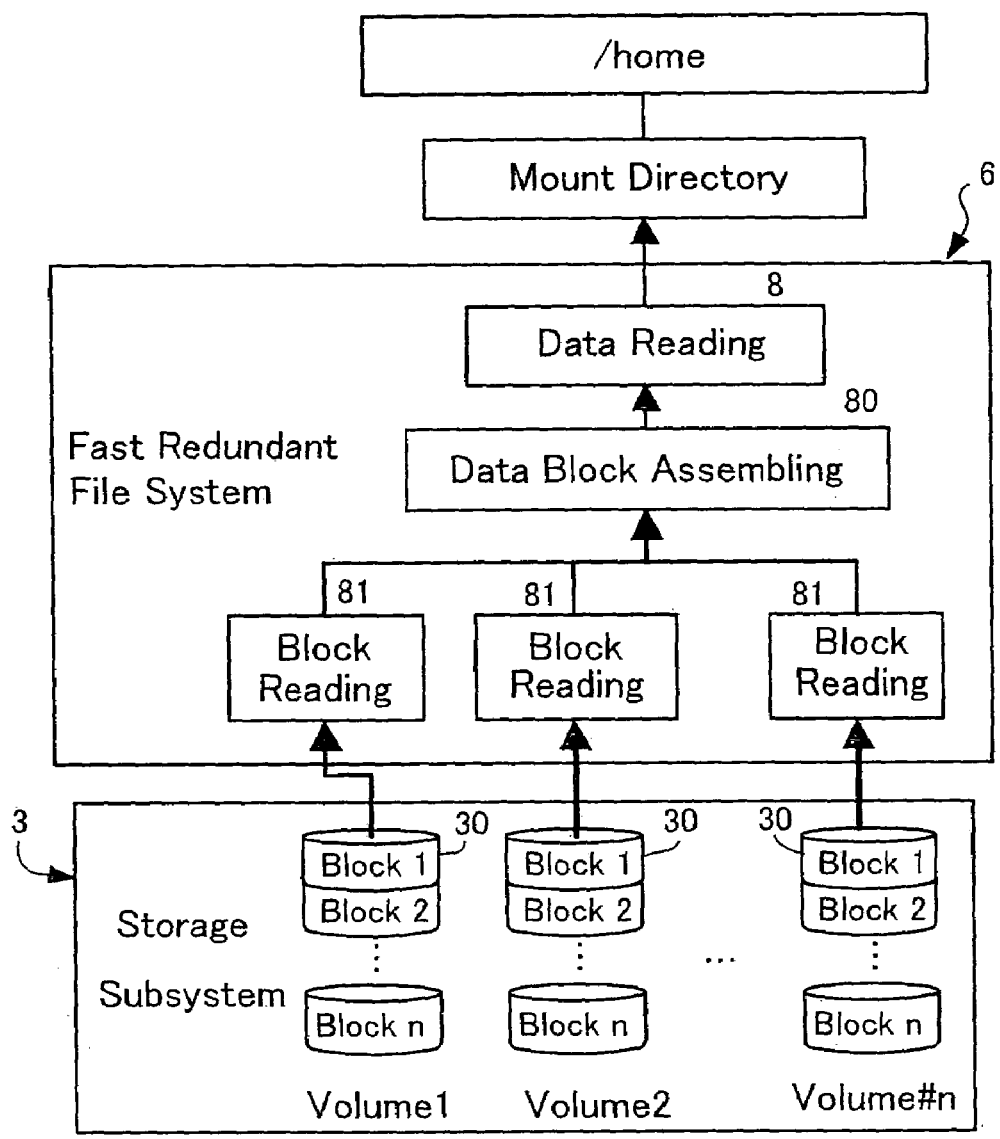
FIG. 8 is an explanatory diagram showing a flow of data when reading according to the first embodiment of the present invention.
Figure 9A:
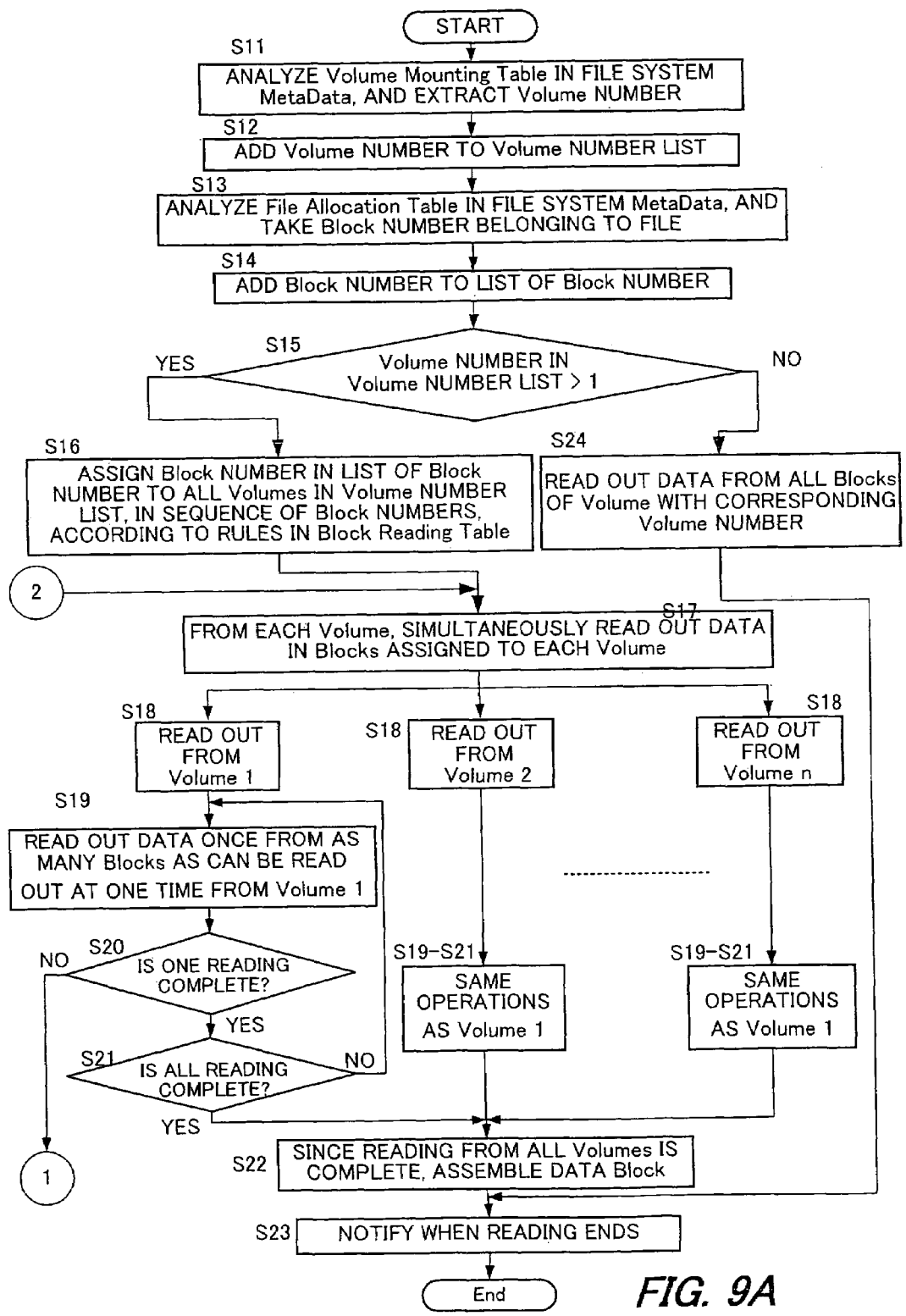
FIG. 9A and FIG. 9B is a flowchart showing an example of controls performed by a read control unit according to the first embodiment of the present invention.
Figure 9B:
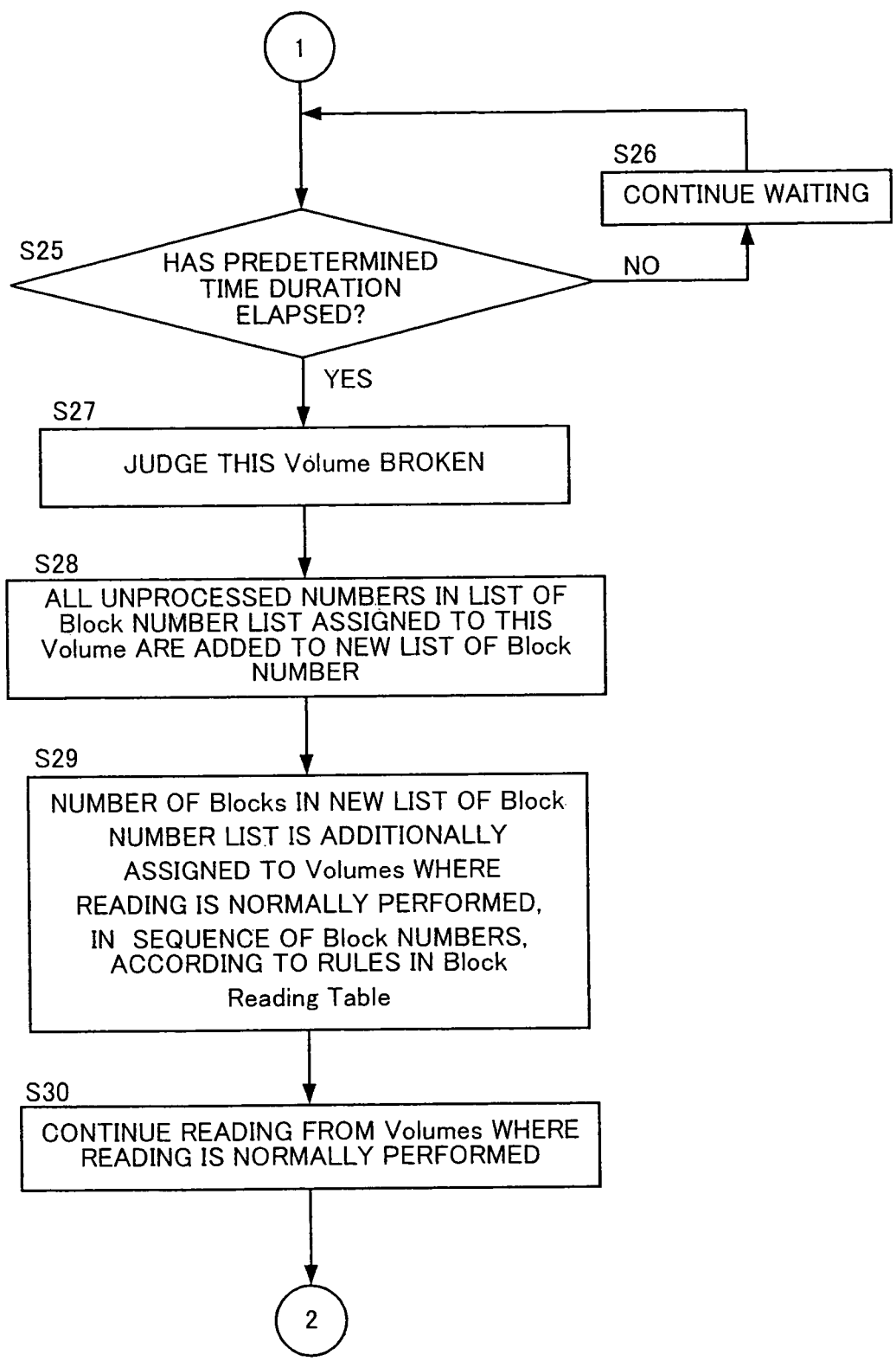
Figure 12:
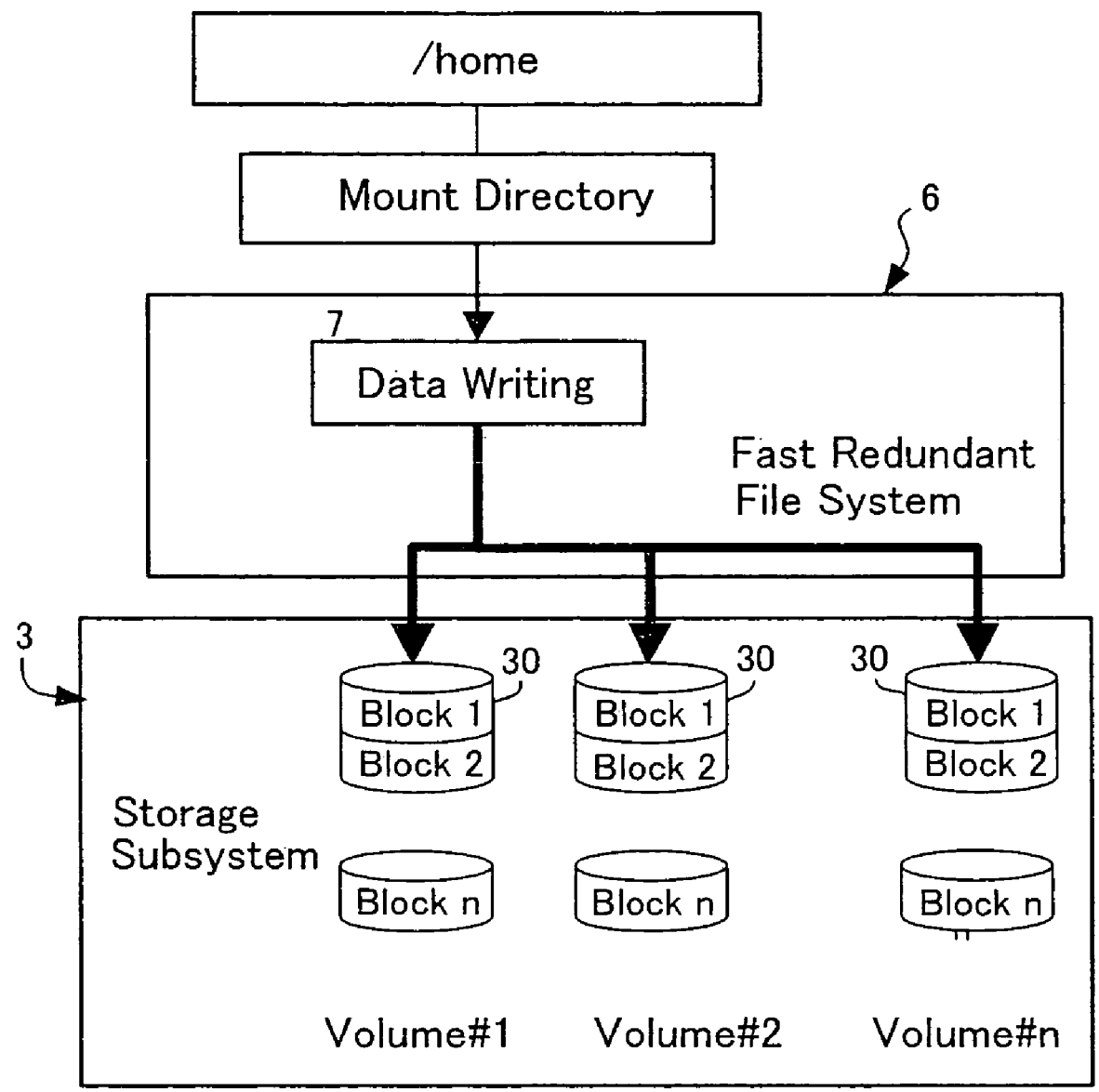
FIG. 12 is an explanatory diagram showing a flow of data when writing according to a second embodiment of the present invention.
Figure 13:
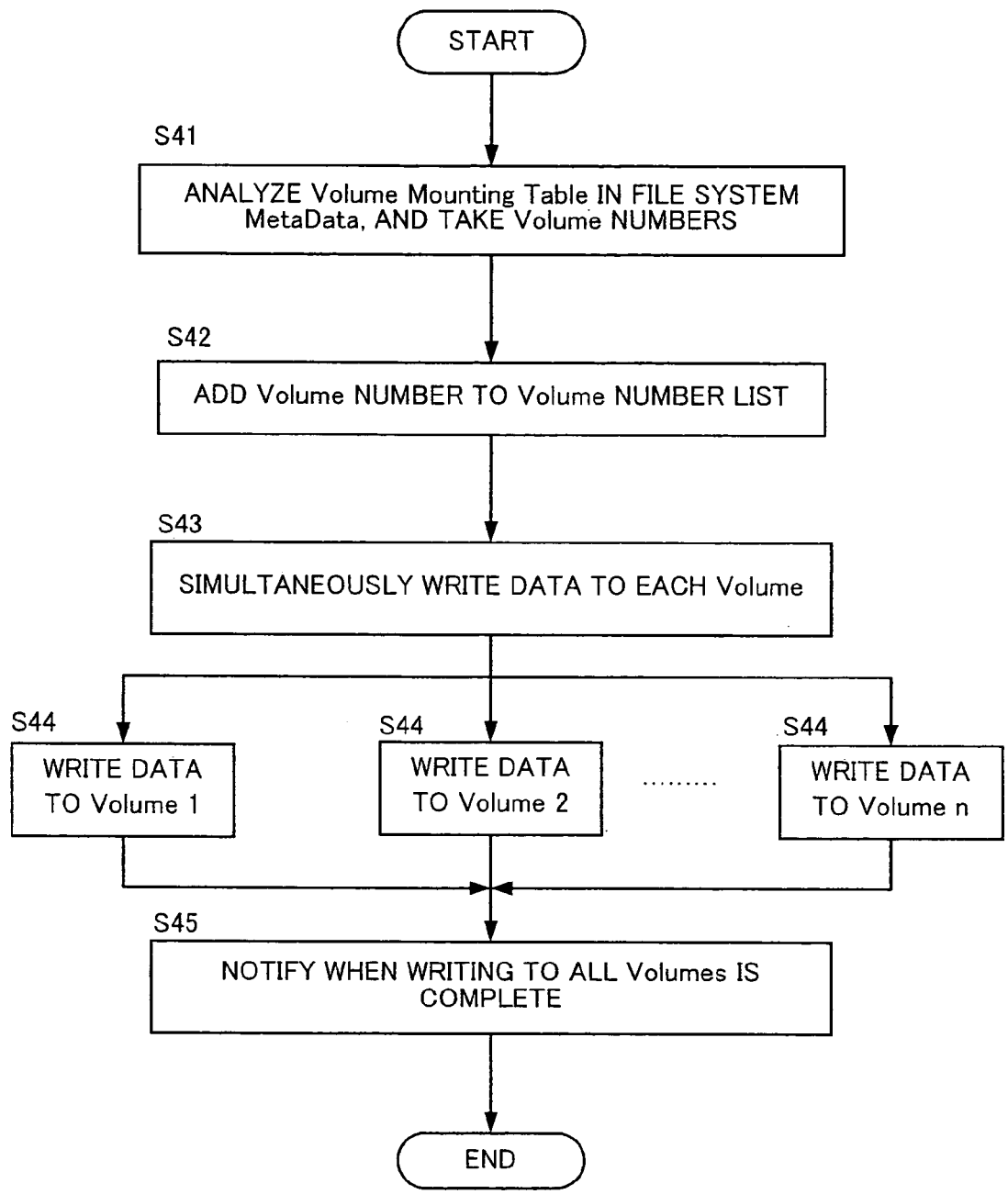
FIG. 13 is a flowchart showing an example of controls performed by the write control unit according to the second embodiment of the present invention.

Next, referring to FIG. 8 to FIG. 10, detailed descriptions are given below regarding the operations of the above-mentioned read control unit 8. FIG. 8 is an explanatory diagram showing a flow of reading processing. FIG. 9A and FIG. 9B are a flowchart of writing processing performed by the read control unit 8. The writing processing in FIG. 12 and FIG. 13 are executed when the write command is received. FIG. 10 shows the volume reading table 12 that is created by the read control unit 8, which set to be read from each volume.

FIG. 9A and FIG. 9B show the case of reading a file (referred to as "X") in the directory "/home" of the file system 6. In FIG. 8, when the read command for a file in "/home" is received from the application 4, the read control unit 8 first reads the mounted volume number from the record corresponding to the directory (Mounted Directory) set in the above-mentioned volume allocation table 9 of FIG. 3 (step S11 of FIG. 9A). In the case of this embodiment, the read control unit 8 reads volumes #1 to #4.

Next, the volume number that was read out is added to the list under "Volume #" in the volume reading table shown in FIG. 12 (step S12 of FIG. 9A).

Then, the list of block numbers where the file is stored is read from the record corresponding to the file name X for which the read command was issued from the file allocation table of FIG. 4 (step S13 of FIG. 9A), and this is written into the list of block number ("The list of block numbers read from each volume" in the diagram) in the volume reading table 12 (step S14 of FIG. 9A).

Here, "Volume #" in the volume reading table 12 is referred to determine whether there are multiple volumes (step S15 of FIG. 9A). When there are plural blocks, the block numbers are assigned in order to read the volumes in parallel (step S16 of FIG. 9A). On the other hand, when there is only one block, all the block numbers are read from one volume (step S24 of FIG. 9A).

Next, when there are plural blocks, each volume written under "Volume #" of FIG. 10 obtains the number of blocks to be read for one read command from the block reading table of FIG. 5, and the block numbers from the list of block number read at step S13 of FIG. 9A are assigned according to the number of blocks that each volume reads (step S16 of FIG. 9A). In other words, all list of block number in the volume reading table 12 of FIG. 10 written at step S14 of FIG. 9A are updated for each volume, according to the number of blocks that are read for a single read command.

This assignment will be explained with respect to a case where, for example, a file "A" in "/home" is stored into the volumes #1 to #4, and the file allocation table 10 is notified that block numbers 1 to 40 are being used.

Regarding the volumes #1 to #4, the block reading table 11 of FIG. 5 indicates that the number of blocks that are read for a single read command is 4 for the volume #1, 3 for the volume #2, 2 for the volume #3, and 1 for the volume #4. Therefore, starting at the volume at the top of the volume reading table 12, the block numbers 1 to 40 which are being used are assigned in order according to the number of blocks each volume reads at a time.

In other words, since the volume #1 reads 4 blocks at a time, the block numbers 1 though 4 are written to update the list of block number in the volume reading table 12. Next, since the volume #2 reads 3 blocks at a time, the next 3 block numbers after those read by the volume #1, which are the block numbers 5 to 7, are written. Since the volume #3 reads 2 blocks at a time, the next 2 block numbers after those read by the volume #2, which are the block numbers 8 and 9, are written. Since the volume #4 reads 1 block at a time, the next block after those read by the volume #3, which is the block number 10, is written. Then, returning again to the volume #1 at the top of the volume reading table 12, the 4 blocks after the block number 11 read by the volume #4, which are the block numbers 11 to 14, are written to update the list of block number in the volume reading table 12. This processing continues to the last of the block numbers.

Thus, as shown in FIG. 10, the block numbers that are read out for each volume number are assigned in the list of block number of the volume reading table 12 according to the volume's performance (i.e., the number of blocks read out for a single read command).

Next, based on the list of block number determined in the volume reading table 12 of FIG. 10, the read control unit 8 instructs the block reading units 81 corresponding to the respective volumes #1 to #4 to read each volume (step S17 of FIG. 9A).

In FIG. 9A, after step S17 the processing is performed in parallel by each of the block reading units 81. For example, the block reading unit 81, which reads the volume #1, reads from the volume #1 of the storage system 3, based on the list of block number determined in the volume reading table 12 of FIG. 10 and the block reading table of FIG. 5. The number of blocks that the volume #1 can read for a single read command (here, 4 blocks) is read (steps S18, S19 of FIG. 9A).

Then, the processing verifies whether the read command was actually executed (step S20 of FIG. 9A). If the reading is complete, the processing then determines whether the reading is complete for all the blocks that are set in the volume reading table 12 (step S21 of FIG. 9A). The loop of steps S19 to S21 of FIG. 9A is repeated until completion.

On the other hand when the single reading was not complete at step S20 of FIG. 9A, the processing goes to error trap processing at steps S25 to S30.

In the error trap processing, first, after waiting for a predetermined period for the reading to finish (steps S25, S26 of FIG. 9B), when there is no response the processing judges that this volume is broken (step S27 of FIG. 9B). In the volume reading table 12 of FIG. 10, a new record is created and a list of block number is created for the unprocessed block numbers out of the block numbers assigned to the broken volume (step S28 of FIG. 9B). Then, the unprocessed block number, which had been assigned to the broken volume, are additionally assigned to the lists of block number of the other normal volumes, according to the number of blocks each volume can read for a single read command (step S29 of FIG. 9B). After that, the volume reading table 12 of the broken block number list is deleted. Thus, when one volume becomes unreadable, the block numbers are assigned to the other normal volumes and reading continues, thus guarantee the redundancy of the data (step S30 of FIG. 9B).

The reading processing that was performed at steps S18 to S21 of FIG. 9A for the volume #1 and the error trap processing are also performed similarly for the other volumes #2 to #4.

Therefore, when a single read command is executed, from the volume #1 are read the block numbers 1 to 4, from the volume #2 are read the block numbers 5 to 7, from the volume #3 are read the block numbers 8 and 9, and from the volume #4 are read the block number 10. In total, the block numbers 1 to 10 are read. Then, this reading is performed 4 times, thus completing the reading of the block numbers 1 to 40 that are set in the volume reading table 12 of FIG. 10.

Then, when all the reading is complete, the block assembling unit 80 of FIG. 8 rearranges in ascending order of block number the block data that were read out by the block reading units 81 corresponding to the respective volumes #1 to #4, to generate the file "A" (step S22 of FIG. 9A). Then, when all the reading ends and the reconstruction of the block is complete, the completion of the reading is notified to the application 4, and the file data is provided and the processing ends. It should be noted that when the processing ends the content of the volume reading table 12 is deleted to prepare for the next time reading.

According to the reading processing described above, the requested files can be read from multiple volumes simultaneously (in parallel), each in multiple block units. This enables a large-capacity file to be read at high speed. For example, a large-capacity file such as a moving image file or a music file can be processed at high speed, and, in the rare even that a failure or the like occurs in one of the volumes of the storage system 3, the file can be read from the other normal volumes, thus providing a high-speed file system that is redundant.

Furthermore, since the number of blocks that each volume can read at a time can be set to a value reflecting the volume's reading performance (the disk drive's reading performance), all the volumes do not have to have the same performance. This produces an advantage that the existing storage system 3 can be utilized effectively, suppressing expanding equipment investment while enabling adoption of a high-speed file system.

Figure 11:
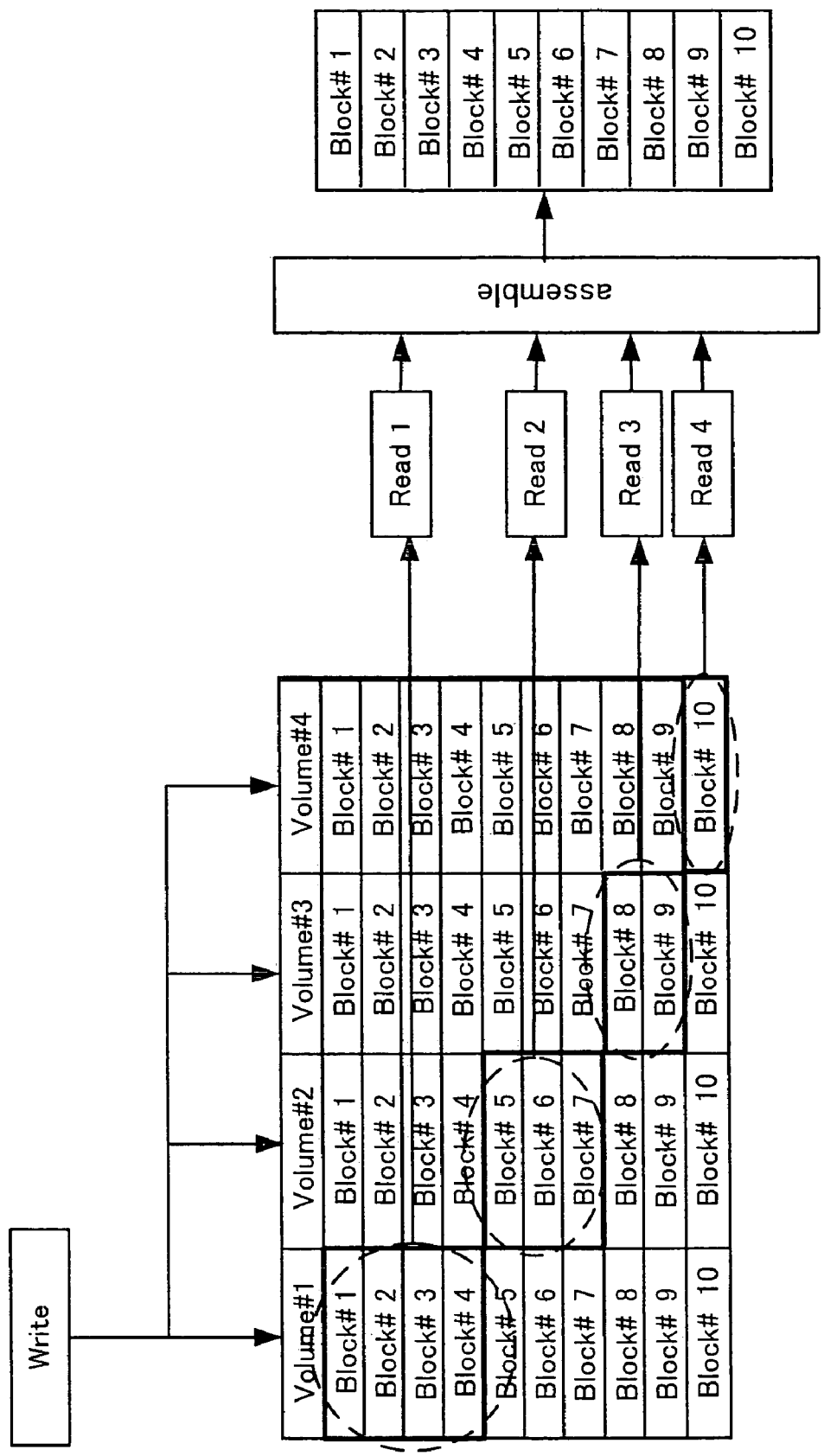
FIG. 11 is an explanatory diagram showing a flow of data according to the first embodiment of the present invention.

As described above, the file system 6 of the present invention is provided with a volume allocation table 9 where all volumes used to write and read are mounted under each directory. As shown in FIG. 11, when writing, the file data is divided to multiple blocks, and each block is written into all the mounted volumes, whereby ensuring the redundancy of the data.

Next, when reading, any block can be read from any volume because all the volumes are mounted. The number of blocks that are read for a single read command is set for each volume beforehand (in the block reading table 11). From the file allocation table 10 and the block reading table 11, where the files' block numbers and the like are recorded, the volume reading table 12, which assigns the block numbers of the file that will be read in volume units, is created. Accordingly, as in Read 1 to 4 shown in FIG. 11, plural blocks can be read simultaneously from plural volumes, and even a large-capacity file can be read at high speed.

Furthermore, by providing the block assembling unit 80 which rearranges the data divided to blocks after the reading is finished, the differences between the read finish times of the each of the volumes are absorbed, so that the file can be created from the divided blocks, maintaining both high speed and reliability.

Furthermore, when a failure occurs in any of the volumes that are being read, the assigned block numbers are reassigned to the other normal volumes, which ensures the redundancy of the data, and enables the realization of a file system possessing redundancy and high-speed reading performance.

It should be noted that when an application is reading a file and another application also tries to read the same file, the reading by the other application is allowed. On the other hand, when writing is being performed, another application can read the same file that is being written, but writing is prohibited. Because of this, whether the application's operation to access the file is to read or write can be judged based on whether the access state in the file allocation table 10 is "read" or "write".

FIG. 12 and FIG. 13 show a second embodiment, in which the distinction between primary and secondary is deleted from the volume allocation table 9 shown in FIG. 3 in the first embodiment. Therefore, mirroring is simultaneously performed to write the same data to all the volumes mounted under each directory. The other constructions are similar to those of the first embodiment.

FIG. 12 is an explanatory diagram showing a flow of writing processing. FIG. 13 is a flowchart of writing processing performed by the write control unit 7. The writing processing in FIGS. 12 and 13 are executed when the write command is received.

When the write control unit 7 receives the write command for a file in "/home" from the application 4, the write control unit 7 first divides the file to plural blocks so that the blocks have given data lengths, and then by referring to the volume allocation table 9 of FIG. 3, reads the volume numbers of all the mounted volumes from the record where "/home" is mounted (step S41 of FIG. 13 of FIG. 9A).

Next, after the list of volume numbers (step S42 of FIG. 13) has been created, the file is written to multiple volumes in parallel (steps S43 and S44 of FIG. 13 of FIG. 9A). Then, when the writing to all the volumes is complete, a notification is sent to the application 4, and the processing ends. It should be noted that the writing processing of each volume (step S44 of FIG. 9A) is generated so as to correspond to the list of volume numbers.

In this case, since it is not necessary to distinguish between primary and secondary volumes mounted under each directory, the processing load required for writing is reduced. Furthermore, since the writing is performed in volume units in parallel, plural ports connectable to each volume of the storage system 3 may be used similarly to the above-mentioned the block reading units 81. It should be noted that writing is similar to the first embodiment.

The foregoing descriptions illustrated the case where the write control unit 7 performs the mirroring by means of software. However, the storage system 3 may also perform the mirroring by means of hardware, although this is not shown in the diagrams.

It should be noted that, in the above-mentioned embodiment, the block reading table 11 of FIG. 5 is set in advance reflecting the reading speeds of the disk drives that constitute the volumes. Specifically, as shown in FIG. 14, it is also possible to create a list of the reading performance of the volumes being used, to set the number of blocks read by a volume with the slowest reading speed ("Read Speed [Mbytes/s]" in the diagrams) to "1", and to set the number of blocks read by the other volumes to multiples of the reading speed of the volume with the slowest reading speed.

Figure 15:
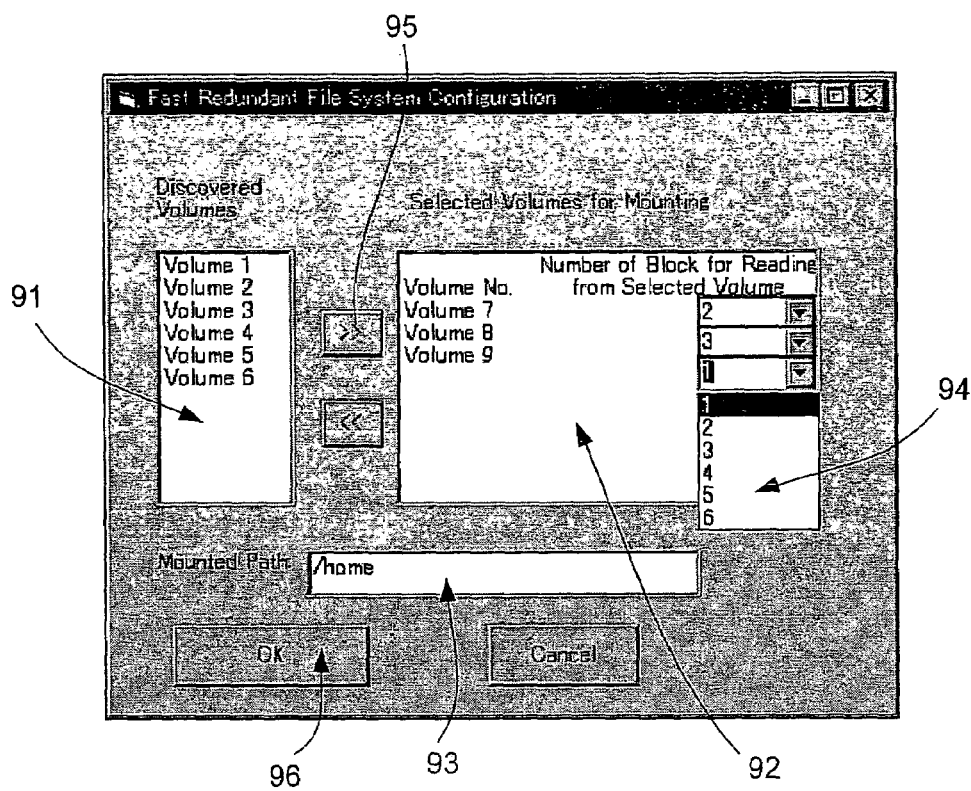
FIG. 15 is an explanatory diagram of a setting screen of the volume allocation table embodying aspect of the present invention.

When mounting the volumes under each directory, if the OS 5 has a GUI the volume allocation table 9 can be operated from the GUI. Explanation is now given regarding a case where, for example, as shown in FIG. 15, there are provided a path input column 93 for inputting a path (directory) where the volume will be mounted, a volume selection column 91 displaying the volumes that can be mounted, and a determining column 92 that displays the selected volume.

First, the user inputs a desired directory name into the path input column 93. Then, the user clicks the mouse on the volume that the user wishes to select from the volume selection column 91. After that, a button 95 is clicked to move the selection to the determining column 92. Thus, the volume allocation table 9 can be set.

Furthermore, the number of blocks in the block reading table 11 may be set at the time the volume is being mounted. In this case, a pull-down list 94 shown in FIG. 15 is displayed on the same row as the volume that was determined, and the number of blocks to be read for a single read command can be set in the pull-down list 94.

Figure 16:
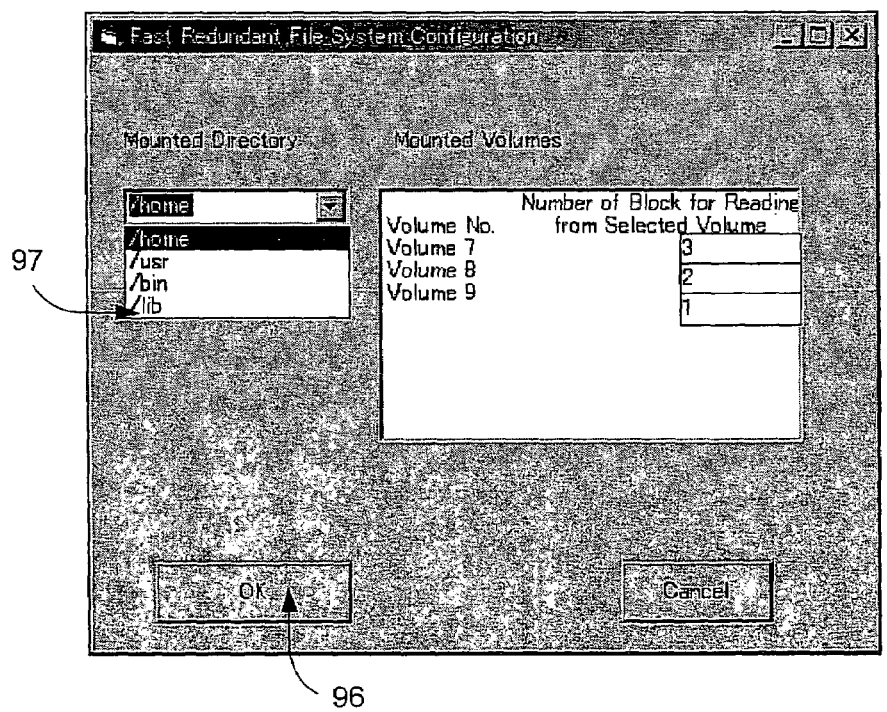
FIG. 16 is an explanatory diagram of another setting screen of the volume allocation table embodying aspect of the present invention.

After mounting of the volume and setting of the number of blocks have been finished, an OK button 96 can be clicked to reflect the settings in the volume allocation table 9 and the block reading table 11, as shown in FIG. 16. It should be noted that, in FIG. 16, the directory that was set is displayed in a list display portion 97. By selecting the directory and clicking the OK button 96, the screen can be changed to a setting screen shown in FIG. 15.

It should be noted that the embodiments described above illustrated an example in which the host computer 1 and the storage system 3 are connected by means of the SAN 2, but they may be connected by means of a LAN.

Furthermore, the embodiments described above illustrated an example in which the storage system 3 performs the replication of the primary volume written by the write control unit 7, and an example in which the write control unit 7 performed the mirroring by means of software. However, it is also possible for the storage system 3 to perform the mirroring of a RAID 1 or the like only when writing.

While the present invention has been described in detail and pictorially in the accompanying drawings, the present invention is not limited to such detail but covers various obvious modifications and equivalent arrangements, which fall within the purview of the appended claims.

What is claimed is:

1. A file system to control accessing files belonging in one of a plurality of directories comprising:
    a storage system having a plurality of volumes;
    a volume allocation table adapted to set the plurality of volumes for each directory;
    a write control module that divides each of the files in the directory on a block basis when a write command is received, and writes the same block into all the volumes set in the volume allocation table;
    a file allocation table that stores attributes and divided block information of the file written into the volumes;
    a block reading table in which numbers of blocks read out by one reading operation are respectively set for each of the volumes; and
    a read control module that controls to read data from each of the volumes;
        wherein a read control module, when a read command is received, is adapted to:
        determine a volume based on a the directory configuration by referring to the volume allocation table,
        determine the number of blocks to read from each of at least two of the volumes by referring to the block reading table,
        determine blocks to be read from each of the at least two volumes based on the volume, the number of blocks, and the block information which are defined in the file allocation table, and
        read date from determined blocks in the at least two volumes.

2. The file system according to claim 1, wherein the read control module mounts all the volumes set in the volume allocation table, and reads data from the at least two volumes.

3. The file system according to claim 1, wherein the read control module comprises a block rearranging module that rearranges the blocks read from each of the at least two volumes based on the block information in the file allocation table, and generates a file from divided data read from the volumes.

4. The file system according to claim 1, wherein
    the read control module creates a volume reading table in which blocks to be read from each volume are respectively set based on the volume read from the volume allocation table based on the directory, the number of blocks to be read in one reading operation, which is read from the block reading table, and the block information from the file allocation table, and
    reads from each volume based on the volume reading table.

5. The file system according to claim 1, wherein the block reading table includes the number of blocks to be read by one reading operation, according to reading performance of the volume.

6. The file system according to claim 1, wherein the read control module includes an error processing module that, when the volumes becomes unreadable, redistributes the blocks that have been set to the volume to another volume.

7. The file system according to claim 6, wherein the error processing module adds unprocessed blocks in a volume reading table corresponding to the unreadable volume to a volume reading table of another volume, based on the number of blocks set in the block reading table.

8. The file system according to claim 1, wherein
    the file allocation table includes an attribute showing whether an access state of a file is "reading" or "writing", and the read control module prohibits reading of a file being written.

9. The file system according to claim 1, wherein
the storage system are connected to a host computer via a network, and
the write control module and the read control module are executed on the host computer.

10. A file system to control accessing files belonging in one of a plurality of directories comprising:
a storage system having a plurality of volumes and replicating contents written in a predetermined volume in another volume;
a volume allocation table in which the plurality of volumes are set for each directory;
a write control module that divides each of the files in the directory on a block basis when a write command is received, and writes data into a predetermined volume that is set in the volume allocation table;
a file allocation table that stores an attribute and divided block information of the file written into the volume;
a block reading table in which numbers of blocks read out by one reading operation are respectively set for each volume; and
a read control module that controls to read data from each of the volumes;
wherein a read control module, when a read command is received, is adapted to:
determine a volume based on the directory configuration by referring to the volume allocation table,
determine the number of blocks to be read from each of at least two of the volumes based on the volume by referring to the block reading table,
determine the blocks to be read from each of the at least two volumes based on the volume, the number of blocks, and the block information which are defined in the file allocation table, and
read from determined blocks in the at least two volumes.

11. A computer program product stored on a computer-readable medium for writing or reading a file belonging in one of a plurality of directories to/from volumes in a storage system in response to a write command or a read command from an application,
the program being adapted to control a computer to:
divide the file included in the directory on a block basis when the write command is received;
write the same block, based on a volume allocation table in which a plurality of volumes are set for each directory, into all the volumes corresponding to a directory of the file;
write the directory and information about the written block into a file allocation table;
obtain the directory from the file allocation table, when the read command is received;
determine a volume based on the directory configuration by referring to the volume allocation table;
determine the number of blocks to be read from each of at least two volumes by referring to a block reading table in which numbers of blocks to be read by one reading operation are respectively set for each volumes;
determine the numbers of blocks to be read from each of the at least two volumes based on the volume, the number of blocks, and the block information which are defined in the file allocation table; and
read date from determined blocks in the at least two volumes.

12. The computer program product according to claim 11, wherein the program control a computer to:
mount all the volumes set in the volume allocation table, and
read data from the at least two volumes.

13. The computer program product according to claim 11, wherein the program controls a computer to:
rearrange the blocks read from each of the at least two volumes based on the block information defined in the file allocation table, and generate a file from divided data read from the volumes.

14. The computer program product according to claim 11, wherein the program controls a computer to:
create a volume reading table in which blocks to be read from each volume are respectively set based on the volume read from the volume allocation table based on the directory, the number of blocks to be read in one reading operation, which is read from the block reading table, and the block information from the file allocation table, and
reads from each volume based on the volume reading table.

15. The computer program product according to claim 11, wherein the block reading table includes the number of blocks to be read by one reading operation, according to reading performance of the volume.

16. The computer program product according to claim 11, wherein, the program controls a computer to redistribute the blocks that have been set to the volume to another volume, when the volumes becomes unreadable.

17. The computer program product according to claim 16, wherein the program controls a computer to add unprocessed blocks in a volume reading table corresponding to the unreadable volume to the volume reading table of another volume, based on the number of blocks set in the block reading table.

18. The computer program product according to claim 11, wherein
the file allocation table includes an attribute showing whether an access state of a file is "reading" or "writing", and
the program control a computer to prohibit reading of a file that is being written.

19. The computer program product according to claim 11, wherein the program controls a computer to write the same file to a plurality of volumes through mirroring or replication.

20. A method of writing or reading a file belonging in one of a plurality of directories to/from volumes in a storage system in response to a write command or a read command from an application, the method comprising
providing with a volume allocation table in which a plurality of volumes are set for each directory, a file allocation table that stores an attribute and divided block information of the file written into the volumes, and a block reading table in which numbers of blocks read out by one reading operation are respectively set for each volumes;
dividing the file included in the directory on a block basis when the write command is received;
writing the same block into all volumes corresponding to a directory of the file, based on the volume allocation table;
writing the directory and written block numbers into the file allocation table;
obtaining the directory from the file allocation table when the read command is received;
determining a volume based on the directory configuration by referring to the volume allocation table;

determining the number of blocks to be read from each of the at least two volumes by referring to the block reading table:

determining identifiers of block to be read from each of the at least two volumes, based on the volume, the number of blocks, and the identifiers of the block which are defined in the file allocation table;

reading data from determined blocks in the at least two volumes; and rearranging the blocks read from each of the at least two volumes, based on the identifiers of the block defined in the file allocation table, and generating a file from divided data read from the volumes.

21. A method of reading a file belonging in one of the directories from volumes in a storage system in response to a read command from an application, the method comprising providing with a volume allocation table in which a plurality of volumes are set for each directory, a file allocation table that stores an attribute and divided block numbers of the file divided on a block basis and written into the volumes, a block reading table in which numbers of blocks read out by one reading operation are respectively set for each of the volumes, and a file allocation table that stores the file directory and written block information, obtaining the directory from tile file allocation table when the read command is received;

determining a volume based on the directory configuration by referring to the volume allocation table;

determining the number of blocks to be read from each of at least two volumes, by referring to the block reading table;

determining identifiers of block to be read from each of the at least two volumes, based on the volume, the number of blocks, and the identifiers of the block which are defined in the file allocation table;

reading data from determined blocks in at least two volumes; and rearranging the blocks read from each of the at least two volumes based on the identifiers of the block defined in the file allocation table, and generating a file from divided data read from the volumes.

* * * * *